United States Patent
Al-Mehthel et al.

(10) Patent No.: US 9,637,635 B2
(45) Date of Patent: May 2, 2017

(54) SULFUR ASPHALT IN ROOFING, DAMP-PROOFING AND WATER PROOFING

(71) Applicants: Saudi Arabian Oil Company, Dhahran (SA); King Fahd University of Petroleum and Minerals, Dhahran (SA)

(72) Inventors: Mohammed Al-Mehthel, Dhahran (SA); Hamad I. Al-Abdul Wahhab, Dhahran (SA); Saleh H. Al-Idi, Dhahran (SA); Ibnelwaleed A. Hussein, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 33 days.

(21) Appl. No.: 14/069,919

(22) Filed: Nov. 1, 2013

(65) Prior Publication Data

US 2015/0122396 A1 May 7, 2015

(51) Int. Cl.
| | |
|---|---|
| C08L 95/00 | (2006.01) |
| C08L 53/02 | (2006.01) |
| C08K 3/06 | (2006.01) |
| C09D 195/00 | (2006.01) |

(52) U.S. Cl.
CPC .............. *C08L 95/00* (2013.01); *C08K 3/06* (2013.01); *C08L 53/02* (2013.01); *C09D 195/00* (2013.01); *C08L 2555/54* (2013.01); *C08L 2555/84* (2013.01); *Y10T 156/10* (2015.01)

(58) Field of Classification Search
CPC ....................................................... C08L 95/00
USPC ........................................................... 156/71
See application file for complete search history.

(56) References Cited

U.S. PATENT DOCUMENTS

| | | | | |
|---|---|---|---|---|
| 2,124,843 | A | * | 7/1938 | Anderton .................... 156/71 |
| 3,094,447 | A | * | 6/1963 | Chamberlain ................. 156/71 |
| 4,079,158 | A | | 3/1978 | Kennepohl et al. |
| 4,135,022 | A | | 1/1979 | Kennepohl et al. |
| 4,145,322 | A | | 3/1979 | Maldonado et al. |
| 4,412,019 | A | * | 10/1983 | Kraus ..................... C08L 95/00 524/66 |
| 5,219,901 | A | | 6/1993 | Burke et al. |
| 5,371,121 | A | | 12/1994 | Bellomy et al. |
| 5,391,417 | A | | 2/1995 | Pike |
| 5,449,401 | A | | 9/1995 | Zuberer |
| 5,573,586 | A | | 11/1996 | Yap et al. |
| 5,672,642 | A | | 9/1997 | Gros |
| 5,928,418 | A | | 7/1999 | Tamaki et al. |
| 6,011,094 | A | | 1/2000 | Planche et al. |
| 6,024,788 | A | | 2/2000 | Tomioka et al. |
| 6,087,420 | A | | 7/2000 | Planche et al. |
| 6,440,205 | B1 | | 8/2002 | Bailey et al. |
| 6,579,921 | B1 | | 6/2003 | Liang et al. |
| 6,695,902 | B2 | | 2/2004 | Hemmings et al. |
| 6,706,108 | B2 | | 3/2004 | Polston |
| 6,824,600 | B2 | | 11/2004 | Bailey et al. |
| 6,872,763 | B2 | * | 3/2005 | Andriolo .................. C08K 5/39 524/68 |
| 6,916,863 | B2 | | 7/2005 | Hemmings et al. |
| 7,226,500 | B2 | | 6/2007 | Honma et al. |
| 7,241,818 | B2 | | 7/2007 | Hemmings et al. |
| 7,276,114 | B2 | | 10/2007 | Polston |
| 7,758,280 | B2 | | 7/2010 | Blackmon et al. |
| 7,879,144 | B2 | | 2/2011 | Hemmings et al. |
| 8,062,413 | B1 | | 11/2011 | Al-Mehthel et al. |
| 8,283,409 | B2 | | 10/2012 | Guymon et al. |
| 2006/0293420 | A1 | | 12/2006 | Prejean et al. |
| 2012/0022182 | A1 | | 1/2012 | Ranka |
| 2012/0103232 | A1 | | 5/2012 | Al-Mehthel et al. |
| 2012/0184650 | A1 | | 7/2012 | Barnat et al. |

FOREIGN PATENT DOCUMENTS

| | | | |
|---|---|---|---|
| EP | 0730006 | A2 | 9/1996 |
| EP | 1498458 | A1 | 1/2005 |
| GB | 2038848 | A * | 7/1980 |
| GB | 2038848 | A | 7/1980 |
| WO | 03014231 | A1 | 2/2003 |
| WO | 2010/120482 | A1 | 10/2010 |
| WO | 2012061371 | A1 | 5/2012 |
| WO | 2012061577 | A1 | 5/2012 |
| WO | 2013063343 | A1 | 5/2013 |
| WO | 2013119789 | A1 | 8/2013 |

OTHER PUBLICATIONS

International Search Report and Written Opinion for related PCT application PCT/US2014/063599 dated Feb. 17, 2015.

(Continued)

*Primary Examiner* — Jeff Aftergut
(74) *Attorney, Agent, or Firm* — Bracewell LLP; Constance Gall Rhebergen

(57) ABSTRACT

A method of waterproofing or damp proofing a protected member having a surface with a sulfur-extended elastomer asphalt binder composition uses a sulfur-extended elastomer asphalt binder composition that includes elemental sulfur, an elastomer and an asphalt binder. The method includes the steps of combining the elastomer with the asphalt binder maintained at an elastomer mixing temperature such that an intermediate asphalt binder mixture forms, and combining elemental sulfur with the intermediate asphalt binder maintained at a sulfur mixing temperature such that the sulfur-extended elastomer asphalt binder composition forms. The method also includes the step of applying the sulfur-extended elastomer asphalt binder composition to the surface of the protected member such that the sulfur-extended elastomer asphalt binder composition contacts, adheres to and forms a layer upon the surface of the protected member. The asphalt binder composition is applied at a temperature no greater than 145° C.

8 Claims, No Drawings

(56) References Cited

OTHER PUBLICATIONS

International Search Report and Written Opinion for related PCT application PCT/US2014/063598 dated Feb. 17, 2015.
ASTM, "Standard Specification for Asphalt Used in Dampproofing and Waterproofing", ASTM International, 2014, p. 121-122, ASTM International.
International Search Report and Written Opinion for related PCT application PCT/US2014/063597 dated Feb. 17, 2015.

* cited by examiner

SULFUR ASPHALT IN ROOFING, DAMP-PROOFING AND WATER PROOFING

BACKGROUND OF THE INVENTION

1. Field of the Invention

The field of invention relates to asphalt compositions for roofing, damp-proofing and water proofing and their use. More specifically, the field relates to sulfur-extended elastomer asphalt binders (SEEABs).

2. Description of the Related Art

During the manufacturing and processing of materials containing asphalt such as asphalt-coated aggregates and hot asphalt mixes, working temperatures above 300° F. can cause problems for workers and their equipment. At temperatures greater than 300° F., sulfur and sulfur compounds present in asphalt or bitumen mixes, including elemental sulfur and naturally present heteroatom organic compounds, begin to react with other constituents in the asphalt and with the oxygen in the air. One of the main products of these reactions is hydrogen sulfide gas, where free sulfur in hydrocarbon environments dehydrogenates hydrocarbons and forms hydrogen sulfide. Hydrogen sulfide in low quantities is an irritant but in high quantities it is toxic. Heated sulfur that oxidizes in the air forms sulfur dioxide. Sulfur dioxide has a noxious odor and is considered an air pollutant. Working in elevated conditions, including on top of metal roofing, or in confined conditions, including basements and pits, can concentrate and exacerbate the exposure to these unwanted byproducts. It is desirable to find an asphalt composition that is workable at temperatures below 300° F. for worker comfort and safety in addition to not releasing noxious chemicals into the environment.

Sulfur, especially "free" or elemental sulfur, is an abundant and inexpensive material. Elemental sulfur is a byproduct of non-sweet natural gas and petroleum processing. Sources of free sulfur include petroleum refineries and gas sweetening plants. Because of the quantity of sulfur extracted annually from natural gas and petroleum processes, many sulfur producers consider elemental sulfur a "waste" product. Others have attempted to use waste sulfur as an expander or filler for asphalt and bitumen compositions but only have obtained limited success. Therefore, it is also desirable to find commercial uses for elemental sulfur. Incorporating sulfur into commercial products can transform what many consider a waste product into a product that has practical value as an expander of the hydrocarbon resource supply.

SUMMARY OF THE INVENTION

A sulfur-extended elastomer asphalt binder composition that is useful for water proofing, damp proofing and roofing applications includes elemental sulfur, an elastomer and an asphalt binder. The sulfur-extended elastomer asphalt binder composition includes elemental sulfur in a range of from about 0.1% to about 30.0%, the elastomer in a range of from about 0.1% to about 10.0% and the asphalt binder in a range of from about 99.8% to about 60%, each by total weight.

A method of waterproofing or damp proofing a protected member having a surface with a sulfur-extended elastomer asphalt binder composition includes a step of combining the elastomer with an asphalt binder maintained at an elastomer mixing temperature such that an intermediate asphalt binder mixture forms. The method also includes the step of combining elemental sulfur with the intermediate asphalt binder maintained at a sulfur mixing temperature such that the sulfur-extended elastomer asphalt binder composition forms. The sulfur-extended elastomer asphalt binder composition comprises elemental sulfur in a range of from about 0.1% to about 10.0%, the elastomer in a range of from about 0.1% to about 30.0%, and the asphalt binder in a range of from about 99.8% to about 60%, each by total weight. The method also includes the step of applying the sulfur-extended elastomer asphalt binder composition to the surface of the protected member such that the sulfur-extended elastomer asphalt binder composition contacts and forms a layer upon and adheres to the surface of the protected member. The asphalt binder composition is applied at a temperature in a range of from about ambient temperature to no greater than 145° C. The formed layer is operable to prevent water migration through the protected member. The formed layer has a first side in contact with and bonded to the surface of the protected member and a second side that does not contact the surface of the protected member. The bonded layer has a bond strength with the surface of at least about 150 kiloNewtwons per meter squared ($kN/m^2$) as determined using the Bond Strength Test.

BRIEF DESCRIPTION OF THE DRAWINGS

No figures.

DETAILED DESCRIPTION OF THE PREFERRED EMBODIMENTS

The Specification, which includes the Summary of Invention, Brief Description of the Drawings and the Detailed Description of the Preferred Embodiments, and the appended Claims refer to particular features (including process or method steps) of the invention. Those of skill in the art understand that the invention includes all possible combinations and uses of particular features described in the Specification. Those of skill in the art understand that the invention is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the invention. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present invention may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The invention encompasses and bounds smaller ranges of the interval subject to any specific exclusion provided.

Where reference is made in the Specification and appended Claims to a method comprising two or more defined steps, the defined steps can be carried out in any order or simultaneously except where the context excludes that possibility.

When a patent or a publication is referenced in this disclosure, the reference is incorporated by reference and in its entirety to the extent that it does not contradict statements made in this disclosure.

Sulfur-Extended Elastomer Asphalt Binder

The sulfur-extended elastomer asphalt binder (SEEAB) is made by combining the asphalt binder, elemental sulfur and the elastomer. The sulfur-extended elastomer asphalt binder is a combination of elemental sulfur in a range of from about 0.1% to about 30.0%, the elastomer in a range of from about 0.1% to about 10.0% and the asphalt binder in a range of from about 99.8% to about 60%, each by total weight of the sulfur-extended elastomer asphalt binder composition. An embodiment of the SEEAB includes where the elemental sulfur is in a range of from about 0.1% to about 10.0% and the asphalt binder is in a range of from about 99.8% to about 80%, each by total weight of the sulfur-extended elastomer asphalt binder composition.

An embodiment of the sulfur-extended elastomer asphalt binder composition consists essentially of elemental sulfur, elastomer and asphalt binder. An embodiment of the composition consists essentially of 5.0% elemental sulfur, 5.0% the elastomer and 90.0% the asphalt binder, each by total weight of the sulfur-extended elastomer asphalt binder composition.

Asphalt Binder

Bitumen and asphalt that are useful as the asphalt binder can originate from petroleum distillation (for example, vacuum tails); coal, tar sands or oil shale processing; or from naturally occurring sources (for example, Trinidad Lakes). The base asphalt material can be a singular material or a blend of several base asphalts.

Asphalt and bitumen is a colloidal dispersion of asphaltenes in a maltenes phase. Asphaltenes include clusters of large polycyclic aromatic molecules. The structure of asphaltenes may include, in no particular order or regularity, cyclo-alkanes, cyclo-alkenes, and alkane and alkene chains extending from polycyclic molecules for up to 30 carbons ($C_{30}$) in length. Asphaltenes can also have functional moieties that are capable of reacting with other materials. Functional moieties include alcohols, carboxylic acids, ketones, phenols, amines, amides, sulfides, sulfoxides, sulfones, sulfonic acids, and porphyrin rings chelated with vanadium, nickel, and iron. Asphaltenes also have heterorganic aromatic rings part of their overall polycyclic structure, including benzothiophene, pyrrole and pyridine rings.

The maltenes phase, which is more mobile than the asphaltene phase, includes asphaltene resins, polar and non-polar aromatics, cyclic saturated hydrocarbons (for example, naphthenes), and both straight and long-chain saturated hydrocarbons. Although not intending to be bound by theory, it is believed that polar aromatics in the maltene phase tend to be the dispersing agent for the asphaltenes, interacting with polar functional groups that can exist on asphaltenes. Maltenes can be partially extracted from the dispersion using an n-alkane-based solvent; asphaltenes cannot.

All asphalt and bitumen are suitable as the asphalt binder. Asphaltene concentration varies in amount and functionality depending on the source of the bitumen. The asphaltene content of the asphalt is typically in the range of from about 0.01% by weight to about 30% by weight of the material. An embodiment of the sulfur-extended elastomer asphalt binder composition includes using "Performance Graded" binders based upon the properties listed in the Performance Grade table ("Table 1") of the AASHTO Performance Graded Asphalt Binder Specification M 320 as the asphalt binder. An embodiment of the asphalt binder composition includes where the asphalt binder comprises a PG 64-10 asphalt binder. An embodiment of the asphalt binder composition includes where the asphalt binder consists essentially of a neat PG 64-10 asphalt binder.

Elemental Sulfur

The elemental or "free" sulfur includes not only singular sulfur atoms but also sulfur in complexes and covalently bonded to other sulfur atoms, including α-sulfur (orthorhombic sulfur), β-sulfur (monoclinic sulfur) and "catena" sulfur. Chains or rings of sulfur atoms can range from a few sulfur atoms to hundreds of covalently linked sulfur atoms. All allotropes of elemental sulfur are suitable for use in the sulfur-extended composition. Sulfur covalently bonded with non-sulfur atoms, such as carbon, hydrogen or other atomic species, including heterorganic compounds, is not considered "free" or elemental sulfur. Because of the wide variety of allotropes, elemental sulfur is found in many different solid and liquid forms and can change between forms based upon modifications to its environment, including heating and pressure. Typically, however, it is handled in either a pellet or powdered solid form or a molten liquid form.

The source of elemental sulfur can be naturally occurring (for example, mined) or a resultant from natural gas or petroleum treatment processes. For example, a well-known and understood natural gas sweetening process converts hydrogen sulfide into elemental sulfur in a Claus unit.

Elastomer

An elastomer is technically defined as a cross-linked, amorphous polymer that is above its glass transition ($T_g$) temperature; however, those of ordinary skill in the art consider elastomers as a class of polymers (thermoplastic or thermoset) that when a load is applied it will yield and stretch (not brittle fracture like a traditional polyolefin, such as atactic polypropylene) and will return to its original form when the load is released. Elastomers tend to have reduced glass transition and melt temperatures than plastomers and traditional polyolefins. Traditional elastomers include diene elastomers, saturated elastomers, thermoplastic elastomers and inorganic elastomers, including silicon and sulfur-based polymers. Elastomers enhance the elastic recovery capacity of the asphalt binder, which makes the asphalt binder resistant to permanent deformation.

Unsaturated thermoplastic elastomers, including styrene-butadiene-styrene (SBS) block copolymers, are known as useful polymers for inclusion in asphalt binder for modifying its thermal and physical properties. Because they are thermoplastic, they can be blended and incorporated with other materials, including asphalts and sulfur. The unsaturated bonds can later be cross-linked to lock in the form while maintaining a significant amount of elasticity. SBS is recognized for its performance-enhancing benefits in road paving applications. An embodiment of the composition includes where the elastomer comprises an SBS block copolymer. An embodiment of the composition includes where the elastomer consists essentially of the SBS block copolymer.

A useful elastomer optionally has pendent functional groups from the polymer backbone that are reactive. The reactive functional groups are operable to react and form covalent bonds with corresponding functional groups on other elastomer molecules or other constituents of the SEEAB, including the free sulfur and reactive moieties in the asphalt binder. The functional groups can become reactive under different process conditions, including at elevated temperatures, in the presence of a catalyst or in an acidic or alkaline medium. Reactive functional groups include primary and secondary alcohols, primary and secondary amines, acid anhydrides, epoxides and parts of other molecules that have unsaturated carbons (that is, double and triple-bonded carbons). An example of a commercially available elastomeric terpolymer with pendent reaction functional units is sold under the name ELVALOY (E.I. du Pont de Nemours and Co.; Wilmington, Del.).

Forming the Sulfur-Extended Elastomer Asphalt Binder

Addition and blending of components of the SEEAB can occur in any order. A non-limiting example includes adding components individually to a pre-heated and stirred asphalt binder material. Addition of the other components to form the SEEAB can occur sequentially or simultaneously.

Blending occurs in a vessel or apparatus appropriate to combine all of the SEEAB components together. Suitable vessels and apparatuses include metal cans with hand blenders, reactors, buckets, mixing bowls, tanks and low- or high-shear mixing processors. The blending apparatus is operable to both maintain the base asphalt, the intermediate composition and the formed SEEAB at a steady temperature greater than ambient conditions as well as mix the components until obtaining uniformity. Maintaining an elevated and steady temperature ensures that upon addition of sulfur to the composition or formation of the SEEAB limits the likelihood of hydrogen sulfide and sulfur dioxide gas formation, which can be harmful to those individuals performing the blending operation. The blending apparatus is operable to induce circulation in the molten asphalt binder and maintains any intermediate blends in a molten form to ensure the thorough incorporation of asphalt binder components.

A process of forming an embodiment of the SEEAB composition includes introducing into the suitable blending apparatus the asphalt binder used as the base material and then heating the asphalt binder to an elastomer mixing temperature. The elastomer mixing temperature is greater than 150° C. and is usually maintained where the base asphalt becomes molten and fluidic, but not much greater than that. In some cases, the base asphalt is heated to an elastomer mixing temperature of about 180° C. The elastomer is introduced to the asphalt binder and mixed at the elastomer mixing temperature until thoroughly incorporated, forming an intermediate asphalt binder mixture. The elastomer mixing temperature is relatively low compared to typical hot mix asphalt applications. Heat is only applied for as long as necessary to blend the elastomer and the asphalt binder together. The risk of forming hydrogen sulfide and sulfur dioxide is low since the base asphalt does not have significant quantities of free sulfur.

Upon thorough incorporation of the elastomer, the temperature of the intermediate asphalt binder mixture cools to a sulfur mixing temperature. The sulfur mixing temperature is in a range of from about the melting point of elemental sulfur to no greater than about 145° C. Depending on the molecular configuration of the free sulfur, the melting point of sulfur varies between about 120° C. and about 140° C. Upon reaching the sulfur mixing temperature, elemental sulfur is introduced and blended for an adequate period into the intermediate asphalt binder mixture until thoroughly incorporated. An embodiment of the sulfur-extended elastomer asphalt binder forms upon incorporation of the sulfur.

The SEEAB is compositionally stable. The SEEAB can be maintained at a temperature greater than ambient but no greater than 145° C. for extended periods for both exterior and interior applications.

Use of the Sulfur-Extended Elastomer Asphalt Binder

In the method of waterproofing or damp proofing, an embodiment of the SEEAB composition is applied to a surface of a protected member to form a water proof or damp proof layer. The formed layer has a first side in contact with and adhered to the surface of the protected member and a second side that is not in contact with the surface of the protected member. The layer adheres to the surface of the protected member and prevents water migration through the protected member. The surface is preferably clean; however, this is not necessary. The SEEAB is particularly suited for applying to roof tops and roofing materials already in place.

SEEAB is useful as a primer for other coatings; roofing; damp-proofing and waterproofing, including adhering roofing sheets to roofs or waterproofing coverings for roofing fabrics; and spray coating for pipes and other industrial protection schemes, including steel and iron. In an embodiment of the method, a second material is introduced to the second side of the layer such that the layer adheres to the second material. The temperature of the layer is in a range of from about ambient temperature to no greater than 145° C. The SEEAB is applied to walls, roofs and other surfaces using asphalt binder spreading and spraying equipment known to one of ordinary skill in the art.

The bonding adhesion demonstrated by the SEEAB to surfaces, especially metal surfaces, over traditional neat asphalt and sulfur-extended asphalt allows it not only to adhere to surfaces but also to materials applied to it while the composition is at a higher-than-ambient temperature, including roofing tiles, crushed stone and aggregate, tar and waxed papers, fabrics and other materials that support waterproofing, damp proofing and roofing construction activities. The bonded layer of sulfur-extended elastomer asphalt binder has a bond strength with the surface of the protected member of at least about 150 kiloNewtwons per meter squared ($kN/m^2$) as determined using the Bond Strength Test.

Forming SEEABs consume a significant amount of "waste" sulfur in a low-temperature asphalt binder application. The SEEAB used includes elemental sulfur in a range of from about 0.1% to about 10.0%, elastomer in a range of from about 0.1% to about 30.0%, and asphalt binder in a range of from about 99.8% to about 60%. In an embodiment of the method, the SEEAB consists essentially of 5.0% elemental sulfur, 5.0% the elastomer and 90.0% the asphalt binder by weight. Maintaining the application temperature of the SEEAB in a range of from about ambient condition to no greater than 145° C. prevents the formation of hydrogen sulfide and sulfur oxides around workers and equipment, especially in isolated and confined environments such as roof tops, basements and generally human-inaccessible locations.

EXAMPLE

Examples of specific embodiments facilitate a better understanding of using the sulfur-extended elastomer asphalt binder composition. In no way should the Examples limit or define the scope of the invention.

The asphalt binder is heated to the mixing temperature of greater than 140° C. The asphalt binder for all of the example compositions is a neat Performance Grade asphalt PG 64-10. When sulfur and an elastomer are both part of the same experimental composition, the polymer is mixed first into the composition at a temperature of about 180° C. until thoroughly incorporated, which forms an intermediate composition. The elastomer for all of the example compositions including an elastomer is a neat styrene-butadiene-styrene (SBS) block copolymer. The intermediate composition is then allowed to cool to a temperature of about 140° C., at which time free sulfur is introduced and mixed until thoroughly incorporated. In compositions where elastomer is not part of the composition, the asphalt binder is heated to a temperature of no greater than 140° C. For all experimental compositions, a blender with a high shear mixing blade combines each component for about 5 minutes to achieve uniformity. Each of the formed experimental compositions (neat asphalt, elastomer-extended asphalt, and sulfur-extended elastomer asphalt binders) are maintained at a temperature in a range of from about 135° C. to about 145° C. for application and experimentation.

Each of the compositions as listed in Table 1 are by total composition weight. For example, "+10% Elastomer" represents a composition that is 10% elastomer and 90% plain or neat asphalt binder, each by total weight of the composition.

Prepared experimental compositions are evaluated for viscosity using ASTM D449 and ASTM D312 physical requirements for asphalt useful for damp proofing, waterproofing and roofing. In addition, the experimental compositions are also analyzed for conformance to ASTM D4402. For penetration, ASTM D5 is followed. For ductility, ASTM D113 is followed. For the softening point temperature, ASTM D36 is followed. For the flash point, ASTM D92 is followed.

The Bond Strength Test is performed using a tensile strength testing apparatus to determine the bond strength of a sample of each experimental composition. The tensile strength testing apparatus measures the maximum stress achieved by an experimental composition that adheres two sample testing plates together that are slowly pulled apart.

The tensile strength testing apparatus for applying the stress to each experimental composition has several portions. The main frame portion consists of two-20 mm thick×75 mm² steel blocks that are spaced at the opposing ends of four 92 mm long cylindrical steel bars. The blocks and bars form a stable equally-spaced rectangular frame. The upper block of the main frame has two holes to accommodate rods from the upper portion traversing through the block. A sample grip having a wedged-like edge slot is operable to slidably interlock with an upper sample testing plate is fixed to the upper block using a short steel rod with a spring bearing. The spring bearing assists in mitigating any unnecessary compressive force while the experimental composition is being inserted in the apparatus. The upper portion of the tensile strength testing apparatus consists of a 20 mm thick×70 mm diameter steel cylinder. Two cylindrical rods are attached to the "bottom" side of the two flat ends of the cylinder. The upper portion couples with and traverses vertically through the upper block of the main frame through the two holes using the two cylindrical rods. The upper portion rests on a bearing or spring suspending system that eliminates any additional load on the testing sample due to the weight of the upper portion. A 3.0 mm screw inserted through each of the two cylindrical rods proximate to the distal end of the steel cylinder is operable to fit into a screw bore hole present along the 20 mm side of the lower sample testing plate to secure it to the upper portion. Through the "top" side of the steel cylinder a hydraulic or screw drive device (for example, a CBR Compression machine) is coupled. The force delivered by the drive device is converted into a constant downward linear motion that acts to produce increasing tension in the experimental composition.

The apparatus uses two 30×20×6 mm rectangular sample testing plates bonded together with the tested experimental composition to perform the Bond Strength Test. The contact surface area for each sample testing plates is 600 mm². There are two sample testing plates: an "upper" and "lower" sample plate. Both testing plates are made of aluminum. The upper sample testing plate is grooved along the length of its 30 mm sides such that the top plate is operable to slidably interlock with a receiving sample grip of the tensile strength testing apparatus. The lower sample testing plate has a 3.0 mm diameter screw-fit hole in the center of each 20 mm side such that a retaining screw can brace the lower plate in its relative position. The receiving sample grip holds the upper sample testing plate in position while the lower sample testing plate moves downward in a perpendicular direction to the contact surface area as it is affixed to the two cylindrical rods of the upper portion of the tensile strength testing apparatus.

The experimental composition effectively has the dimensions of 30×20×6 mm and forms within the volume of the two sample testing plates. The testing sample of the experimental composition is prepared using the two sample testing plates. The two sample testing plates are placed perpendicular to one another, spaced 6 mm apart from each contact surface area and fixed into position with the aid of a retainer, forming a gap between the plates. Three sides of the gap between the two sample testing plates are enclosed by a non-sticking paper. The experimental composition is heated to a temperature sufficient for it to flow and to fill the 3600 mm³ sample volume gap without forming spaces or voids between the two testing plates. The experimental composition adheres to the contact surface area of each sample testing plate. Once the gap is filled, the testing sample of the experimental composition and sample testing plates cool together as an assembly before removing the non-sticking paper. Typically, 15 minutes is sufficient for the testing sample of the experimental composition to cool to the touch and stabilize. If necessary, the assembly is cooled for 5 minutes in a freezer after waiting 30 minutes for the assembly to cool sufficiently to peel the non-stick paper. The experimental composition assembly is then introduced into a 25° C. water bath for at least 90 minutes directly before testing.

The Bond Strength Test involves loading the 3600 mm³ test sample of the experimental composition with tension at a rate of 1.27 mm/minute at 25° C. During the Bond Strength Test, the downward motion produces an increasing stress in the experimental composition as it attempts to remain adhered to the two sample testing plates. Load magnitude and deformation are detected during the Bond Strength Test. The drive device detects the tension produced in the experimental composition as the drive device moves at a constant rate downward. The maximum detected force before catastrophic bonding failure for the testing sample and the sample plate surface area is the reported bond strength. The bond strength is presented in kiloNewtons per square meter (kN/m²).

The test results are presented in Table 1. Cells in Table 1 labeled with "X" indicate that the test was not conducted.

TABLE 1

Various properties of neat asphalt binder, elastomer-extended asphalt binder with 0-10 wt. % elastomer, and several sulfur/elastomer extended asphalt binders with varying amounts of elastomer and sulfur.

| Binder Type | Flash Point (° C.) | Softening Point (° C.) | Ductility (cm) | Penetration @ 25° C. under 100 g load for 5 seconds (tenths of mm) | Viscosity (cp) at 135° C. (20 rpm) | Bond strength at 25° C. (kN/m2) |
|---|---|---|---|---|---|---|
| Plain Asphalt | 338 | 52.3 | 150+ | 67.6 | 571.0 | 25.83 |
| +5% Elastomer | 330 | 86.9 | 14.5 | 24.1 | 7988 | 105 |
| +10% Elastomer | 330 | 106.9 | 4 | 21.6 | >13000 | X |
| +5% Sulfur, +5% Elastomer | 150 | 81.4 | 24 | 30.5 | 6938 | 155 |
| +5% Sulfur, +3% Elastomer | 180 | 62 | 71 | 27.3 | 1500 | X |
| +10% Sulfur, +5% Elastomer | X | 75.5 | 51 | 41.2 | X | X |

As Table 1 shows, the 5/95 elastomer/asphalt composition shows over a 300% improvement in bond strength over plain asphalt, whereas the 5/5/90 elastomer/sulfur/asphalt composition shows over 500% improvement in bond strength using the Bond Strength Test. The dramatic increase in adhesion as shown using the Bond Strength Test with the 5/5/90 elastomer/sulfur/asphalt composition over the 5/95 elastomer/asphalt composition (over 40%) is surprising. An embodiment of the composition has a bond strength of greater than 150 kN/m² as determined using the Bond Strength Test.

Table 1 shows that the 5/5/90 elastomer/sulfur/asphalt composition has a reduced viscosity (not greater than 7500 cP) compared to the 5/95 elastomer/asphalt composition. The 5/5/90 elastomer/sulfur/asphalt composition is about 13% less viscous comparatively than the 5/95 elastomer/asphalt composition, which makes the 5/5/90 elastomer/sulfur/asphalt composition easier to work with in standard asphalt binder processing equipment. The addition of sulfur to the composition appears to mitigate some of the viscosity effects of adding the elastomer.

The 5/5/90 elastomer/sulfur/asphalt composition also has an increased ductility (greater than 20 cm) as compared to the 5/95 elastomer/asphalt composition. The 5/5/90 elastomer/sulfur/asphalt composition is about 65% more ductile than the 5/95 elastomer/asphalt composition. The 5/10/85 elastomer/sulfur/asphalt composition is about 350% more ductile than the 5/95 elastomer/asphalt composition. Higher ductility makes the binder more resistant to cracking, which is useful as a layer for preventing water penetration that may be exposed to environmental effects.

The 5/5/90 elastomer/sulfur/asphalt composition has a flash point temperature that is no greater than about 200° C. The same composition also has a softening point temperature of less than 83.0° C. and has a penetration of greater than 25 tenths of a millimeter.

What is claimed is:

1. A method of waterproofing or damp proofing a protected member having a surface with a sulfur-extended elastomer asphalt binder composition, the method comprising the steps of:
    combining an unsaturated elastomer with an asphalt binder maintained at an elastomer mixing temperature such that an intermediate asphalt binder mixture forms, the elastomer mixing temperature being at least 150° C. and the unsaturated elastomer including a styrene-butadiene-styrene (SBS) block copolymer;
    then combining elemental sulfur with the intermediate asphalt binder maintained at a sulfur mixing temperature such that the sulfur-extended elastomer asphalt binder composition forms with a viscosity that is less than the viscosity of the intermediate asphalt binder and that is no greater than 7500 cP per ASTM D449, the sulfur mixing temperature being no greater than 145° C.; and
    applying the sulfur-extended elastomer asphalt binder composition at a temperature in a range of from about ambient temperature to no greater than 145° C. to the surface of the protected member such that the sulfur-extended elastomer asphalt binder composition contacts, adheres to and forms a layer upon the surface of the protected member that is operable to prevent water migration through the protected member;
    where the sulfur-extended elastomer asphalt binder composition consists essentially of 5.0% elemental sulfur, 5.0% unsaturated elastomer, and 90.0% asphalt binder, each by total weight of the sulfur-extended elastomer asphalt binder composition,
    where the formed layer has a first side in contact with and adhered to the surface of the protected member and a second side that does not contact the surface of the protected member, and
    where the bonded layer of sulfur-extended elastomer asphalt binder has a bond strength with the surface of the protected member of at least about 150 kiloNewtons per meter squared (kN/m²) as determined using the Bond Strength Test.

2. The method of claim 1 further comprising the step of introducing a second material to the second side of the layer such that the layer adheres with the second material, where the temperature of the layer during introduction is in a range of from about greater than ambient temperature to no greater than 145° C.

3. The method of claim 2 where the second material is selected from the group consisting of roofing tiles, crushed stones, stone aggregates, tar papers, waxed papers, non-flammable fabrics and combinations thereof.

4. The method of claim 1 where the asphalt binder is a Performance Grade asphalt per the AASHTO Performance Graded Asphalt Binder Specification M 320, Table 1.

5. The method of claim 4 where the asphalt binder consists essentially of a PG 64-10 asphalt cement.

6. The method of claim 1 where the unsaturated elastomer consists essentially of a SBS block copolymer.

7. The method of claim 1 where the composition has a ductility that is no less than 20 cm per ASTM D113.

8. The method of claim 1 where the composition has a softening point temperature of less than 83° C. per ASTM D36 and has a penetration of greater than 25 tenths of a millimeter per ASTM D5.

* * * * *